United States Patent [19]
Hafer

[11] 3,731,256
[45] May 1, 1973

[54] PLUG-IN BUS DUCT
[75] Inventor: Paul M. Hafer, Florence, Ky.
[73] Assignee: Arrow-Hart, Inc., Hartford, Conn.
[22] Filed: Aug. 30, 1971
[21] Appl. No.: 176,001

[52] U.S. Cl. ............................... 339/22 B, 174/68 B
[51] Int. Cl. ............................................. H01r 13/60
[58] Field of Search .................. 339/22 B, 22 R, 262; 174/99 B, 88 B, 68 B, 71 B

[56] References Cited

UNITED STATES PATENTS

| | | |
|---|---|---|
| 2,968,781 | 1/1961 | Staskowski .............................. 339/22 |
| 3,482,202 | 12/1969 | Wallace et al. ...................... 339/22 B |
| 3,009,011 | 11/1961 | Fisher ...................................... 174/88 |
| 3,614,297 | 10/1971 | Carlson ................................ 174/88 B |
| 3,636,237 | 1/1972 | Hafer .................................... 174/68 B |

Primary Examiner—Marvin A. Champion
Assistant Examiner—Robert A. Hafer
Attorney—Edward B. Evans et al.

[57] ABSTRACT

A plug-in bus duct comprised of a group of elongated, flat busbars positioned in side-by-side relation within an elongated housing, the housing having the side walls of a height substantially greater than the width of the busbars. Insulator sheets separate the busbars one from the other, and from the sides of the housing, to form a side wall-insulator sheet-busbar 'sandwich.' In preferred form, the busbars are all of the same cross-sectional configuration and dimensions, and each retains a planar configuration along its entire length from one end of the duct to the other. This construction leaves the top and bottom edges of the busbars exposed within the housing. An insulator template is installed in each of a plurality of openings cut in the top and bottom of the housing at spaced intervals therealong. Each template cooperates with the insulator sheets to define a series of stab chambers insulated one from the other, each stab chamber being partially defined by an exposed busbar edge; each chamber is adapted to receive one stab from a plug unit in a manner that permits the stab to make contact with the exposed edge of the busbar in that chamber, thereby allowing power to be taken off the bus duct through the plug unit and dispersed into power leads. A cover is provided for each of the housing's openings, the cover being pivotable between a position at which the stab chambers are opened to receive the plug unit's stabs and a position at which the stab chambers are closed.

15 Claims, 9 Drawing Figures

Patented May 1, 1973

INVENTOR.
Paul M. Hafer
BY
Wood, Herron & Evans
ATTORNEYS

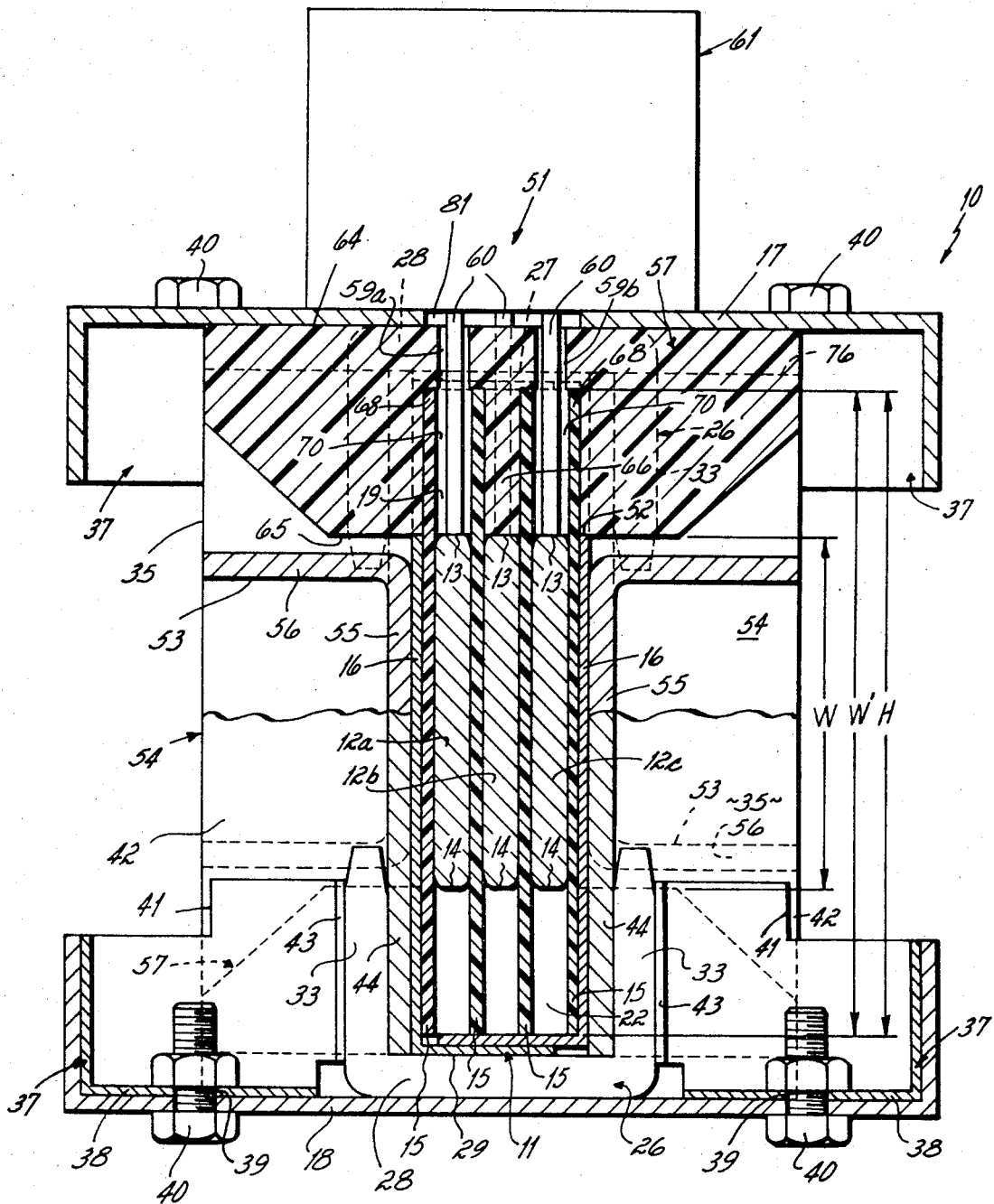

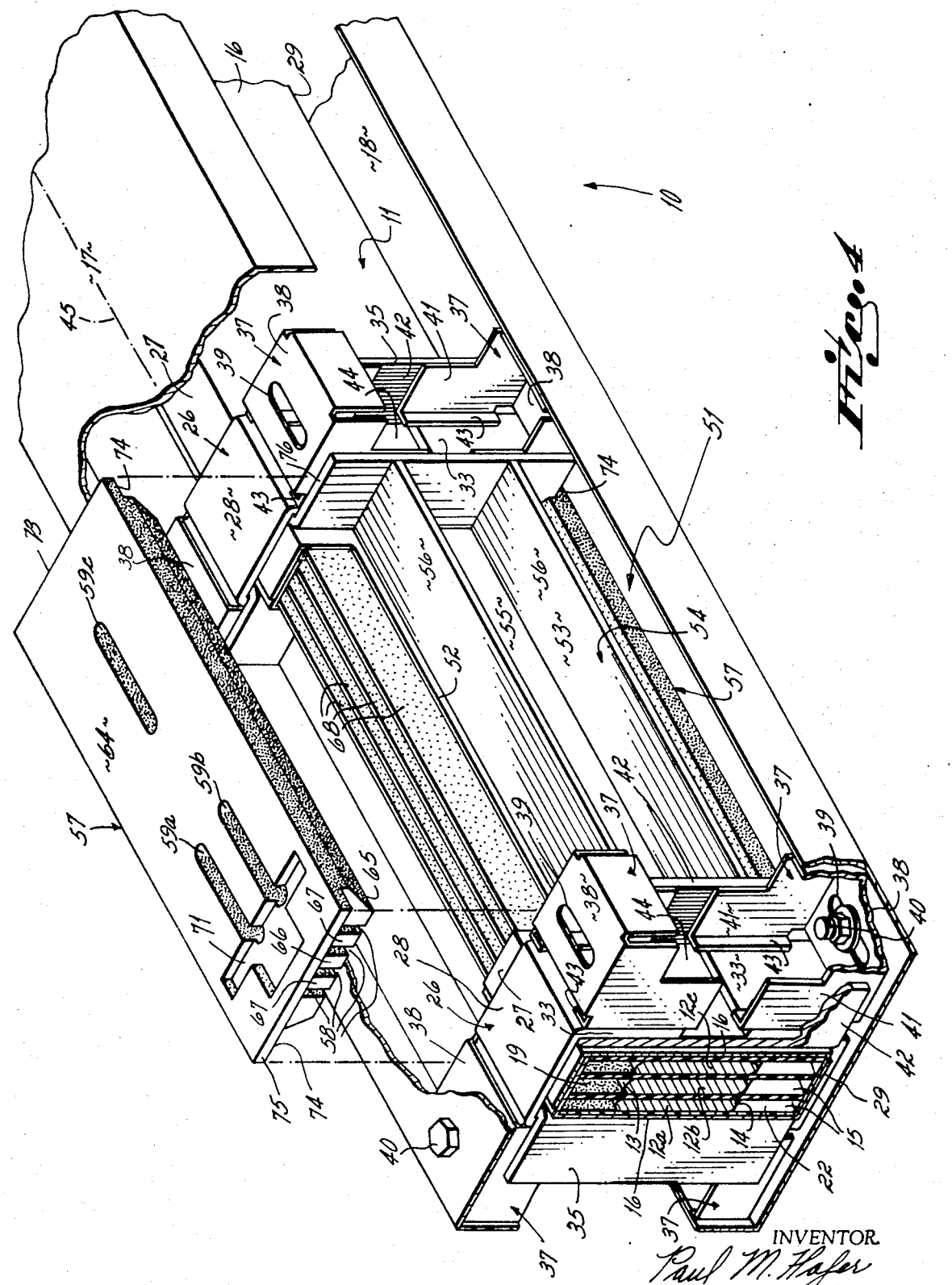

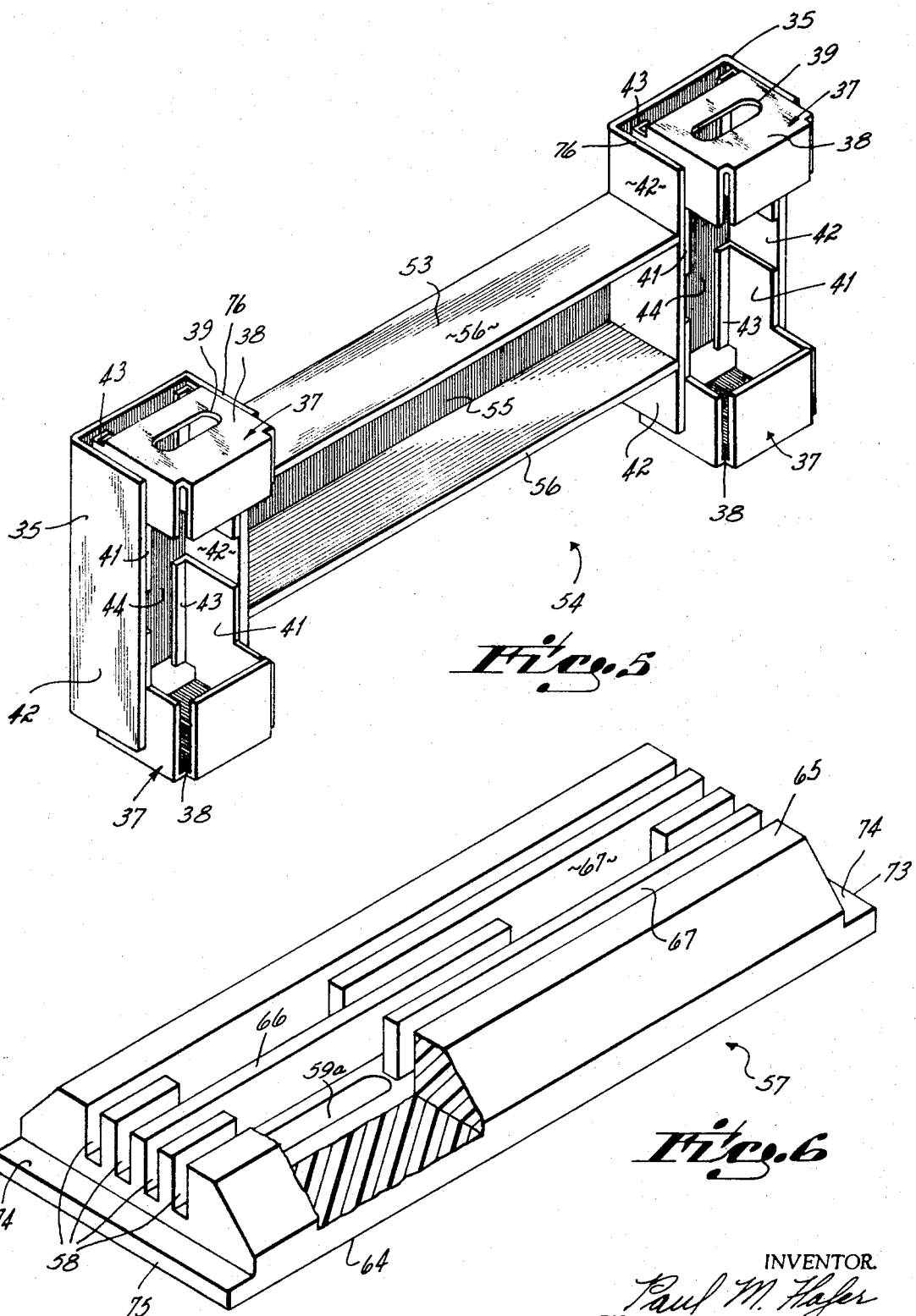

PLUG-IN BUS DUCT

This invention relates to bus ducts and, more particularly, relates to a novel plug-in bus duct.

Electric power distribution systems in industrial and commercial buildings utilize busbars to transfer electric power from a substation or transformer bank to a power consuming area. Such power distribution systems are generally made up of a plurality of bus ducts of variable lengths, the bus ducts being connected or interlocked one to the other in end-to-end relation by a suitable busbar coupler system to provide electrical continuity between the power source and the power consuming area.

A bus duct is comprised of a group of elongated busbars supported in insulated relation relative one to the other within an elongated housing. One type of bus duct structure that has recently been marketed is that type having a plurality of elongated, flat busbars positioned in side-by-side relation within a housing, the housing having a pair of elongated side walls of a height substantially greater than the width of the busbars. The busbars and housing side walls are separated one from the other only by insulation means of the type generally having a thickness less than the thickness of a single busbar. Bus ducts of this general design have been found particularly desirable for use in relatively low voltage value situations, for example, 600 volts and below, as well as in relatively high amperage value situations, for example, 100 amperes and over. Such a bus duct structure has been found particularly useful in certain applications because both reactance and impedance are decreased for a given length of bus duct. That is, for a given length of this type bus duct the voltage drop has been found to be less than in a bus duct construction where the busbars may be separated in their side-by-side relation by, for example, air spaces. Further, this type bus duct structure has been found more efficient in dissipating heat created within the busbars when same are loaded with the maximum or approximately maximum amperage capacity. Additionally, the size and weight of a bus duct having this type structure is minimized, thereby making final installation of the duct easier for the contractor.

In the power consuming area which an electric power distribution system serves, the lengths of the bus duct are provided with a special structural configuration at one or more points along their length that permits power to be taken off and distributed to machinery or the like in that area. The specially configured bus duct that permits power to be taken off intermediate its length is generally known as a plug-in bus duct. With all plug-in bus ducts, a plug unit is required to tap power from the bus duct and transfer it into power leads. There are many different types of plug unit designs and, as a matter of fact, generally speaking each manufacturer designs his own plug unit for use with his own plug-in bus duct. Because of this approach to the creation of a power distribution system, the bus duct line marketed by a manufacturer must include a plug-in bus duct and a plug unit, thereby allowing power to be tapped from any given bus duct run at a desired point therealong and transferred through power leads to the power consuming area.

One bus duct structure of the type described (i.e., of the type where the busbars are separated one from the other and from the sides of the housing only by insulation positioned therebetween, where the insulation is of a lesser thickness than the thickness of the busbars, and where the housing's side walls are substantially greater in height than the width of the busbars) is particularly set forth in U.S. Pat. application Ser. No. 70,010, invented by Paul M. Hafer, filed Sept. 8, 1970, and assigned to the assignee of this application. The bus duct structure taught in that application provides a couple of distinct advantages over similar type bus duct structures known to the art. For example, the bus duct structure taught in that application is comprised of simple parts and is easy to assemble during manufacture, thereby providing economical manufacturing costs. Further, the bus duct structure taught in that application does not require insulative wrapping of the busbars, does not require special assembling of the busbars into a preformed assembly, does not require special bonding agents for adhering the housing side walls to the busbar assembly, and does not require welding equipment for achieving the final housing configuration.

This invention is directed to a novel plug-in bus duct structure of that type wherein the busbars are separated one from the other, and from the sides of the housing, only by insulator sheets positioned therebetween to form a side wall-insulator sheet-busbar 'sandwich.' In preferred form, the busbars are all of the same cross-sectional configuration and dimensions, and each retains a planar configuration along its entire length from one end of the duct to the other. Such a structural configuration leaves the top and bottom edges of the busbars exposed within the housing. According to the principles of this invention, an insulator template is installed in each of a plurality of openings cut in the top and bottom of the housing at spaced intervals therealong. Each template cooperates with the insulator sheets to define a series of stab chambers insulated one from the other, each stab chamber being partially defined by an exposed busbar edge; each chamber is adapted to receive one stab from a plug unit in a manner that permits the stab to make contact with the exposed edge of the busbar in that chamber, thereby allowing power to be taken off the bus duct through the plug and dispersed into power leads. A cover is provided for each of the housing's openings, the cover being pivotable between a position at which the stab chambers are opened to receive the plug unit's stabs and a position at which the stab chambers are closed.

Therefore, it has been one objective of this invention to provide a plug-in bus duct that is basically comprised of a group of elongated, flat busbars positioned in side-by-side relation within an elongated housing, the busbars being separated one from the other only by insulation that is of a lesser thickness than the thickness of the busbars and the housing having side walls of a height substantially greater than the width of the busbars.

It has been another objective of the invention to provide a plug-in bus duct of the type set out in the above paragraph in which the busbars retain their planar configuration from one end of the bus duct to the other, i.e., do not have offset or other type deformations in the plug-in area of the bus duct that are especially adapted for a plug unit.

It has been another objective of the invention to provide a plug-in bus duct of the type set out in the above two paragraphs that makes use of insulator sheets positioned between the busbars, and between the busbars and side walls, to form a side wall-insulator sheet-busbar 'sandwich,' such a structure leaving the top and bottom edges of the busbars exposed.

It has been a further objective of this invention to provide a plug-in bus duct that utilizes the structural concepts of that bus duct structure taught in U.S. Pat. application Ser. No. 70,010 filed Sept. 8, 1970, invented by Paul M. Hafer, and assigned to the assignee of this application.

Other objectives and advantages of this invention will be more apparent from the following detailed description taken in conjunction with the drawings in which:

FIG. 3 is an end cross-sectional view taken along line 3—3 of FIG. 2, and also showing a plug unit in operating engagement with the take-off section;

FIG. 4 is a partially exploded, partially broken away perspective view of a take-off section;

FIG. 5 is a perspective view of the unitary reinforcing member used on each side of a take-off section;

FIG. 6 is a perspective view of the underside of an insulator template used at each take-off section.

Figures 1, 2, 2A, 2B, 7:
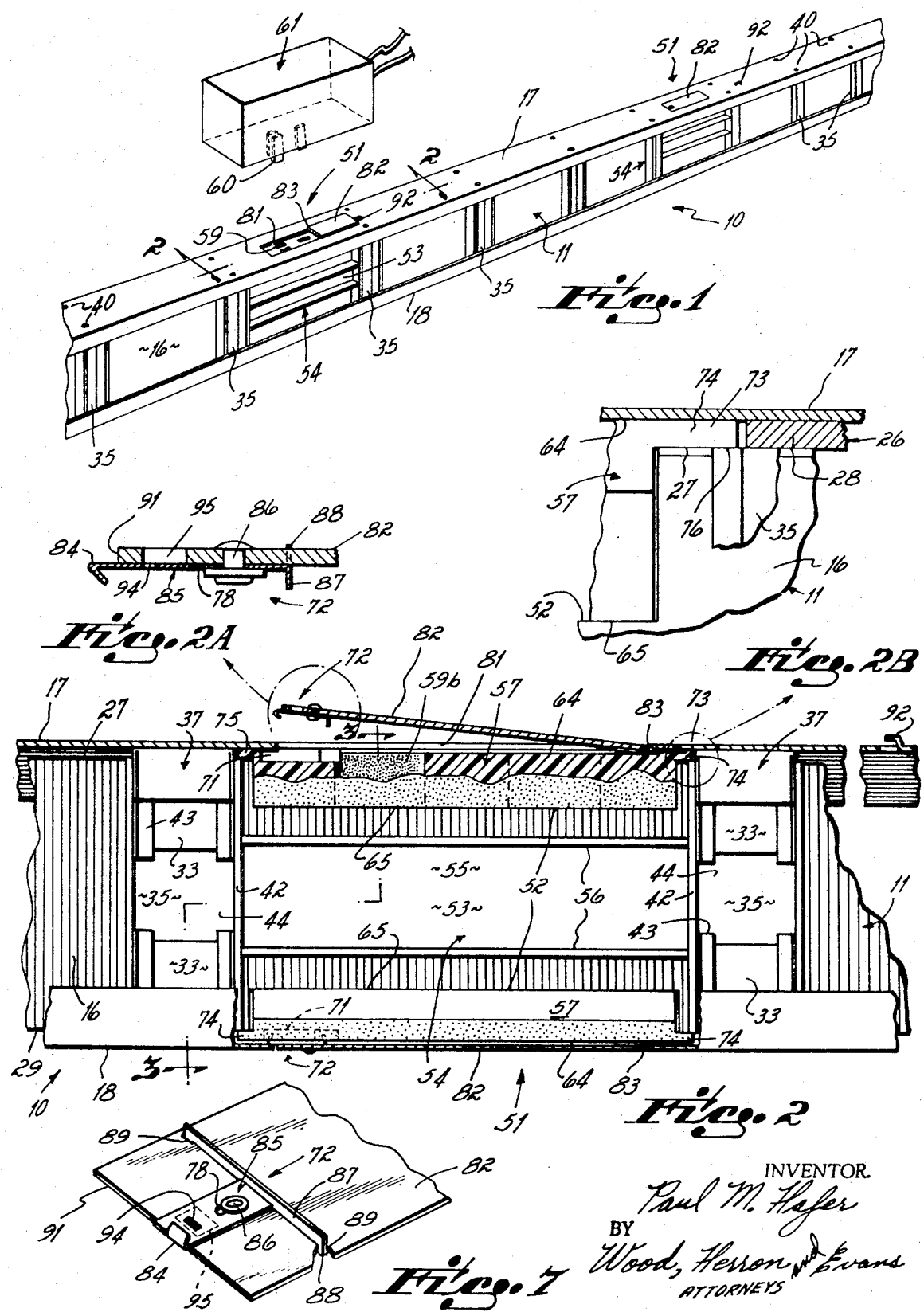
FIG. 1 is a perspective view of the plug-in bus duct of this invention and a plug unit adapted for use therewith.
FIG. 2 is a side cross-sectional view of one of the duct's take-off sections and is taken along line 2—2 of FIG. 1.
FIG. 2A is an enlarged fragmentary view of one encircled area of FIG. 2.
FIG. 2B is an enlarged fragmentary view of another encircled area of FIG. 2.
FIG. 7 is a perspective view of a cover's latch from the underside thereof.

As illustrated in FIGS. 1, 2, 3, and 4, the plug-in bus duct 10 of this invention includes a housing 11 and a group of separate, elongated, flat busbars 12a, 12b, 12c positioned in side-by-side relation within the housing. The busbars 12 are of substantially the same external dimensions, and are positioned in a group having opposite edges 13, 14 in a substantially common plane to form a rectangular cross-section, i.e., the cross-sectional configuration and dimensions of one busbar is the same as that of all others, see FIGS. 3 and 4. A series of separate, flat, elongated insulator sheets 15 are positioned between adjacent busbars 12, and between each of the housing's side walls 16 and the outermost busbars 12a, 12c of the group, to insulate the busbars one from the other and from the housing's side walls. Note that, in this 'sandwich' relationship of the busbars 12a–12 and insulator sheets 15, the busbars are each of a planar configuration along the entire length of each busbar from one end of the bus duct 10 to the other. Thus, the insulator sheets 15 and the busbars 12 are arranged flatwise in side-by-side relation and lie parallel with the housing's side walls 16. This is true even in the plug-in areas or take-off sections 51 located along the bus duct's length, i.e., no offset or other special configuration for the busbars is provided in the take-off sections 51, thereby providing a less complex plug-in bus duct structure in the take-off sections of the bus duct than is usually found in bus ducts of the plug-in type.

Referring to FIG. 3, note that the height H of the housing's side walls 16 is substantially greater than the width W of the busbars 12, the width of each busbar being equal to the width of all other busbars. Also, note that each of the insulator sheets is of a width W' substantially greater than the width W of the busbars 12, and each insulator sheet's width dimension W' is preferably on the order of the inside height dimension H of the housing's sides 16. Also note that the thickness of the insulator sheets 15 is substantially less than the thickness of the busbars 12.

The side walls 16 of the bus duct's housing 11 are comprised of channel sections which face toward one another and are telescoped into one another when finally assembled, see FIGS. 3 and 4. The housing's top 17 and bottom 18 are also channel sections, and these sections also face toward one another but are sufficiently spaced away one from the other so that they do not in any sense telescope one within the other when finally assembled. The busbars 12 are centered relative to the housing's side walls 16, that is, the busbars are spaced equally from the housing's top 17 and bottom 18, so that an air gap 19 is provided above the top edge 13 of the busbars and an air gap 22 is provided below the bottom edge 14 of the busbars, see FIGS. 3 and 4. As shown in the Figures, the insulator sheets 15 extend a substantial distance into the air gaps 19, 22 and extend up adjacent to the top edges 27 of side walls 16 and adjacent the bottom edges 29 of the side walls. Such a width dimension W' of the insulator sheets 15 acts to prevent electrical creepage between adjacent busbars 12 and between the outermost busbars and the housing's sides 16.

At least two U-shaped clips 26 are positioned to span the housing's side walls 16 at separate positions longitudinally spaced from one another along the top edges 27 of the side walls, the spanning portion 28 of each of the clips being substantially spaced above top edge 13 of the busbars and in substantially the same plane as the housing's top 17, see FIGS. 3 and 4. Likewise at least two U-shaped clips 26 are positioned to span the housing's side walls 16 at separate positions longitudinally spaced from one another along the bottom edges 29 of the side walls, the spanning portion 28 of each of these clips being substantially spaced below bottom edge 14 of the busbars and in substantially the same plane as the housing's bottom 18. The clips 26 are provided to restrain mechanically the busbar 12 group, the insulator sheets 15, and the side walls 16 in compact, assembled side-by-side relation. That is, clips 26 hold the busbars 12, insulator sheets 15, and side walls 16 in functional assembly by squeezing the side walls toward one another, thereby acting to maintain the busbar-insulator sheet-side wall combination or 'sandwich' in the desired spatial and operational configuration. When in locking or clamping position after assembly of the bus duct, the legs 33 of each clip 26 are positioned on the outside of the side walls 16 and the clip's spanning portion 28 spans the side walls. The clips 26 are preferably positioned in pairs longitudinarily along the bus duct, each pair comprising a top clip and a bottom clip and each pair being disposed in a plane substantially transverse to the axis of the bus duct, see FIGS. 2, 3 and 4.

The bus duct's housing 11 is additionally provided with a plurality of reinforcement members 35 in the form of heavy-duty channels, the heavy-duty channels 35 being positioned against each of the side walls 16, see FIGS. 1–4. Each reinforcement member 35 forms a part of a complete force frame surrounding the busbars 12, insulator sheets 15 and side walls 16, the force frame for holding the busbars 12 and insulator sheets 15 is assembled 'sandwich' relation thus including clips 26, side walls 16 and reinforcement members of the heavy-duty channels 35. Each of the heavy-duty channels 35 is positioned substantially transverse to the axis of the bus duct 10 against the housing's side walls 16, and a heavy-duty channel 35 is positioned to cooperate with each pair of the U-shaped clips 26 on each side of the bus duct's housing. The width of the spanning portion 28 of each U-shaped clip 26 is sufficient to permit the legs 33 to embrace the two heavy-duty channels 35 positioned on opposite sides of the housing 11 against the housing's side walls 16, as well as the group of busbars 12, insulator sheets 15 and the side walls.

A bracket 37 is welded to the upper end and to the lower end of each heavy-duty channel 35, see FIGS. 2, 3, 4, and 5. Each bracket 37 includes a base portion 38 having an elongated slot 39 therein; the base is integral with leg portions 41 that are welded to the inside of flanges 42 of the reinforcement member 35. Each leg 41 of the bracket 37 has a guide strip 43 formed thereon. The guide strips 43 are thus fixed to the heavy-duty channel 35 since the bracket 37 is welded thereto. The guide strips 43 of each bracket are positioned such that a gap is provided between the guide strips and the base 44 of the heavy-duty channel 35 after welding the two parts together. The legs 33 of The legs U-shaped clip 26 are received in the slots so defined when the U-shaped clip is assembled with the busbar 12-insulator sheet 15-side wall 16 'sandwich.' This structure prevents the legs 33 of the clips 26 from flaring outwardly in times of high short circuit stress and serves to reinforce the bus duct assembly.

The elongated slot 39 in each bracket 37 is positioned to receive bolts 40 which pass through suitable holes in the top 17 and bottom 18 of the housing 11, the top and bottom of the housing thereby being bolted to the brackets 37. Thus, the top 17 and bottom 18 are indirectly fixed to the side walls 16 through brackets 37 that are mounted (for example, welded) to heavy-duty channels or rigid support members 35.

Each length of the plug-in bus duct of this invention has at least one take-off section 51 located in either the top 17 or bottom 18 of the duct. Preferably, however, the take-off sections 51 are located together in pairs along the axial length of the plug-in bus duct, one being provided in the top 17 of the duct every time one is provided in the bottom 18 of the duct; with such a structure the installer of the plug-in bus duct need not worry as to which is the top and which is the bottom of the duct. Further, more than one pair of take-off sections 51 may be provided in each length of plug-in bus duct, the number of pairs provided being dependent on the end use of the bus duct and the number of power take-offs required in the power consuming area. The portion of plug-in bus duct 10 illustrated in FIG. 1 includes two pairs of take-off sections 51, each pair having a take-off section in the housing's top 17 and a take-off section in the housing's bottom 18.

Each take-off section 51 is located between two successive pairs of vertical reinforcing members 35. Corresponding notches or sections 52 are cut out of the top edge (and/or bottom edge) of the telescoped together side walls 16; note that only the side walls are so notched, thereby leaving the insulator sheets 15 extending up into the opening or notches cut into the side walls, see particularly FIG. 4. This construction makes the top edges 13 of the busbars 12 accessible from outside the duct since the busbars are not covered with any insulation on the top edges 13 or bottom edges 14 thereof.

A horizontal reinforcing member 53 is welded between the two vertical reinforcing members 35 located at each end of the side wall notches 52, see FIGS. 4 and 5. Thus, in each take-off section 51 area of the bus duct 10, two successive vertical reinforcing members 35 are fixed together one with the other by a horizontal reinforcing member 53 to form an H-shaped reinforcing part 54 as illustrated in FIG. 5, one of these parts 54 being located against the outside of each side wall 16. The H-shaped reinforcing parts 54 are held in fixed relation with the duct's housing 11 and, in fact, serve to hold the busbars 12-insulator sheets 15 and side walls 16 in operable assembly, by U-shaped clips 26. The horizontal reinforcing member 53 is also of a channel-shaped configuration with the base 55 thereof flush against the side wall 16 of the housing 11, thereby adding two more fins in the form of channel sides 56 by which heat can be dissipated to the atmosphere in the take-off area. The H-shaped parts 54 cooperate with U-shaped clips 26 to further reinforce the housing 11 in that area of the take-off section when same is provided with a plug 61 for power take-off or simply during normal usage of the bus duct, such being desirable because of the notches 52 cut in side walls 16.

The opening 52 cut in the side walls 16 at the top thereof receives a template 57, see FIGS. 4 and 6. The template 57 is formed of an insulating material and is provided with a number of grooves 58 in its bottom face 65 equal to the number of insulator sheets 15 that separate the busbars 12 one from the other and that separate the housing's side walls 16 one from the other. The grooves 58 are of a width substantially equal to the thickness of the insulator sheets 15, and the grooves are of a depth sufficient to embrace the insulator sheets when the template 57 is located thereon as illustrated in FIG. 3. The template 57 is also provided with a series of slots 59 therethrough from the top face 64 to the bottom face 65, the slots being equal in number to the number of busbars 12 carried by the housing. The slots 59 are not located in alignment transverse to the bus duct's axis 45, but are instead staggered axially of the bus duct's axis in the template 57 so that not more than every other slot is located in the same transverse plane. This provides added rigidity to the template from a mechanical strength standpoint and, further, provides added rigidity to the insulator sheets 15 in the notch 52 area of the take-off section 51.

In the case of the two stabs' slots 59a, 59b, an insulative rib 66 is positioned between the insulator sheets 15 that embrace busbar 12b so as to aid in preventing damage to those insulator sheets when the plug's stabs 60 are in place and to provide additional electrical insulation between the stabs, see FIGS. 3 and 6. In the case of the stab slot 59c, insulative ribs 67 are located in between the insulator sheets 15 which embrace busbars 12a and 12c for the same purpose. Thus, the insulative template 57 is received in the opening 52 in the top duct of housing 11, the template's grooves 58 being located over exposed edges 68 of the insulator sheets 15 and cooperating therewith to center slots 59 over the top edge 13 of busbars 12. Because the template 57 is of a thickness sufficient to fill substantially the air gap 19 above the busbars' top edge 13, the slots 59 in and the ribs 66, 67 on the template cooperate with the insulator sheet 15 to define stab chambers 70 insulated one from the other. The plug's stabs 60 are received vertically from outside the housing 11 to make electric contact with the edges 13 of the busbars 12 in the stab chambers 70 so defined, see FIG. 3.

The template 57 is provided with a lip 74 extending from the forward 75 and trailing 73 ends thereof, see FIGS. 2, 2B and 4–6. The axial length of the template 57 is such that, in cooperation with these lips 74, the template 57 is mechanically supported on top edges 76 of the vertical reinforcing members 35 and on the top face 27 of the side walls 16, thereby supporting same in the operating attitude within the take-off section 51. Thus, the template 57 is not totally supported by the insulator sheets 15 cooperating with the grooves 58 on the bottom face 65 thereof, although it may be so supported to some extent if desired. But the main support of the template 57 in its operating environment comes from the lips 74 overlying certain support means which is a part of the bus duct's housing 11, namely, the top face 27 of the side walls 16 and the edges 76 of the vertical reinforcing members 35. To assemble the template 57 with the bus duct's housing 11, same is simply slipped into place over insulator sheets 15. The template 57 is held within the housing 11, once the top 17 of the housing is bolted in place to brackets 37, by virtue of the rectangular hole 81 in the housing's top being of smaller dimensions than the rectangular periphery of the template. This housing top 17—template 57 geometry provides a rectangular frame, so to speak, in the housing's top that overlies the lips 74 and other peripheral portions of the template 57 to restrain same in its operating environment, see FIGS. 2 and 2B. It will be particularly noted that this allows a very simple method of assembly requiring no special tools or skill on the part of the assembler.

The opening 81 in the housing's top 17 is provided with a door 82 that is pivotable between a closed position (see bottom take-off section 51 shown in FIG. 2) where access to the stab chambers 70 defined by the template 57 and insulator sheets 15 is sealed from the environment of the bus duct 10, and an open position (see FIG. 1 and top take-off section shown in FIG. 2) at which the stab chambers are exposed to receive a plug's stabs 60. The door 82 is in the form of a flat sheet metal piece simply cut out of the housing's top 17, and is provided with substantially the same external dimensions and configuration as the opening 81 in the top. The door 82 is pivotally mounted to the housing's top 17 by a hinge 83.

It is to be noted that the door 82 is flush with the top 17 just as though it were a part thereof when the door is closed. This is made possible by the door's latch 72 which is, essentially, located on the underside of the door, see FIGS. 2, 2A and 7. The top face 64 of the template 57 is provided with a recessed forward section 71 to cooperate with the latch 72, see FIG. 4. The latch 72 is in the form of a T-shaped piece that includes a latch finger 84 at the forward end of a slide plate 85, the slide plate being mounted for reciprocable movement through a slot 78 therein that cooperates with a stud 86 fixed to the door 82. A leaf spring 87 is fixed to the slide plate 85 opposite the latch finger 84, the spring tending toward a straight line configuration at all times and having a tit 88 at each end received in notch 89 in the underside of the door 82. The slide plate 85 and, hence, the latch finger 84, are constantly urged toward the latching position where the latch finger is extended out beyond the free edge 91 of the door 82, see FIG. 2A. Of course, when the door 82 is in the closed attitude the latch finger 84 extends beneath the housing's top 17 so as to maintain the door in the closed position. When the door 82 is in the open position where it overlies, and is positioned flush against, the housing's top 17, the latch finger 84 cooperates with a tab 92 raised out of the plane of (but which is fixed to) the housing's top so as to maintain the door in the open position and so that same does not swing closed or to some intermediate position; this is particularly useful when the bus duct is hung from a ceiling and when the plug 61 is installed on the underside thereof.

The door 82 itself is opened, or is removed from engagement with the raised tab 92, by a hand tool inserted in slot 94 within latch's slide plate 85. When the door 82 is in the closed attitude, the slide plate is simply retracted until the latch finger 84 is removed from underneath the housing's top 17 (the slot 94 in the slide plate 85 is accessible through a hole 95 formed in the door); the door is then lifted out of the same plane as the housing's top 17. This manual operation is easily carried out by an operator through use of a screwdriver. When closing the door 82 from the open attitude where the latch finger 84 is restrained beneath the raised tab 92, the screwdriver is inserted in the slot 94 and the slide plate retracted until the latch finger is removed from underneath the raised tab; the door is then simply pivoted closed on hinge 83.

As noted previously, it is preferred that the take-off sections 51 be paired, one on the top 17 and one on the bottom 18 of the plug-in bus duct 10, at each location along the axial 45 length of the bus duct. This allows freedom in installation of the bus duct 10 without worry as to which side 17 or 18 is most conveniently faced for future installations of plug units 61 when same proves desirable. Further, and as mentioned, the plug-in bus duct of this invention makes use of the novel structural concepts taught in U.S. Pat. application Ser. No. 70,010, filed Sept. 8, 1970, invented by Paul M. Hafer and assigned to the assignee of this application. Basically, the plug-in bus duct of this invention makes use of the bus duct structure taught in U.S. Pat. application Ser. No. 70,010, but includes at least one structurally unique take-off section 51 in the bus duct's top or bottom between the ends thereof. To the extent necessary, the description of U.S. Pat. application Ser. No. 70,010 is incorporated herein by reference to facilitate understanding of the plug-in bus duct structure of this invention.

The ends (not shown) of the bus duct's housing 11 in the plug-in bus duct 10 of this invention, and the ends (not shown) of the busbars 12 themselves of the plug-in bus duct of this invention, may be formed as described in connection with that bus duct taught in U.S. Pat. application Ser. No. 70,010. Further, the plug-in bus duct 10 of this invention may be employed with a busbar coupler system of the type taught in U.S. Pat. No. 3,559,148, issued Jan. 26, 1971, invented by Paul M. Hafer and assigned to the assignee of this application. Further, a plug unit 61 of the type taught in U.S. Pat. application Ser. No. 176,066, filed simultaneously herewith, invented by Paul M. Hafer, and assigned to the assignee of this application, may be employed with the plug-in bus duct 10 of this invention.

Having described in detail the preferred embodiment of my invention, what I desire to claim and protect by Letters Patent is:

1. A plug-in bus duct comprising
a group of elongated, flat busbars positioned in side-by-side relation,
an elongated housing having side walls of a height substantially greater than the width of said busbars, thereby establishing an air gap between the top edges of said busbars and the top of said housing and an air gap between the bottom edges of said busbars and the bottom of said housing,
structure defining a stab access opening in at least one of the top and bottom of said housing, said stab access opening communicating with one of said air gaps,
insulation means including insulator sheets of a width substantially greater than the width of said busbars disposed between said busbars and the sides of said housing to separate said busbars one from the other and from the sides of said housing, said busbars being separated one from the other and from said side walls only by said insulation means, said insulation means being arranged to leave at least one of the top and bottom edges of said busbars exposed within the area of said housing's stab access opening, and
a take-off section that allows power to be taken off said bus duct through a plug unit, said take-off section including an insulator template that is installed within one of said air gaps adjacent said stab access opening, said template having a number of slots that extend through said template from its top face to its bottom face and that are equal to the number of said busbars, said template also having a series of grooves on its bottom face aligned axially of said bus duct with the width of each groove being approximately equal to the thickness of its associated insulator sheet, said insulator sheets being received in said grooves and cooperating with said slots to define a series of stab chambers insulated one from the other within said housing such that each chamber can receive one stab from the plug unit through said stab access opening in electrical contact with the exposed edge of a busbar.

2. A plug-in bus duct as set forth in claim 1 further comprising
a cover fixed to said housing, said cover being pivotable between a position at which said stab access opening is open so that said stab chambers can receive the plug unit's stabs and a position at which said stab access opening is closed to the environment of said bus duct.

3. A plug-in bus duct as set forth in claim 1 wherein said template is provided with a lip extending therefrom at each of its ends, said lip being adapted to rest on structure immobily fixed to said housing, thereby locating said template in spatial relation within that air gap where it is positioned.

4. A plug-in bus duct as set forth in claim 1 wherein said insulator template is of a thickness substantially equal to the height of that air gap where it is positioned, and wherein said slots are staggered axially of said bus duct so that the slots serving two adjacent busbars are not in the same transverse plane.

5. A plug-in bus duct as set forth in claim 1 including a take-off section on the top of said housing and a take-off section on the bottom of said housing, said take-off sections being aligned substantially transversely to the axis of said bus duct.

6. A plug-in bus duct as set forth in claim 1 including
a clip spanning said side walls adjacent each end of said take-off section along the top of said side walls, the spanning portion of each of said clips being substantially spaced above said busbars,
a clip spanning said side walls adjacent each end of said take-off section along the bottom of said side walls, the spanning portion of each of said clips being substantially spaced below said busbars,
all of said clips serving to restrain mechanically said busbar group and said side walls in compact side-by-side relation.

7. A plug-in bus duct as set forth in claim 6 wherein said top and bottom clips are positioned in pairs, each pair comprising a top clip and a bottom clip and being in a plane substantially transverse to the axis of said bus duct, and wherein said clips are substantially U-shaped and fitted over the top edges and bottom edges of said side walls, the legs of said clips being positioned on the outside of said side walls.

8. A plug-in bus duct as set forth in claim 7 wherein said housing further includes
an H-shaped reinforcing member positioned against each of said side walls in the area of said take-off sections for reinforcing said housing configuration, the legs of said H-shaped members being positioned substantially transverse to the axis of said bus duct, and said H-shaped members being restrained in position against said side wall by said top clips and said bottom clips.

9. A plug-in bus duct comprising
a group of elongated, flat busbars positioned in side-by-side relation,
an elongated housing having side walls of a height substantially greater than the width of said busbars, thereby establishing a gap between the top edges of said busbars and the top of said housing and a gap between the bottom edges of said busbars and the bottom of said housing,
structure defining a stab access opening in at least one of the top and bottom of said housing, said stab access opening communicating with one of said gaps,
insulation disposed between said busbars and the sides of said housing to separate said busbars one from the other and from the sides of said housing, one of the top and bottom edges of each of said busbars being exposed within said housing in the area of said stab access opening, and said busbars and said insulation and said side walls being positioned in 'sandwich' configuration with no air gaps therebetween, and a take-off section that allows power to be taken off said bus duct through a plug unit, all of said busbars being planar in configuration from one end of said bus duct to the other including those portions within said take-off section, and said take-off section including an insulator template located within said stab access opening, said template defining a series of stab chambers adapted to cooperate with the exposed edges of said busbars and insulated one from the other within said housing such that each chamber may receive one stab from the plug unit through said stab access opening into electrical contact with the exposed edge of a busbar.

10. A plug-in bus duct as set forth in claim 9 further including structure defining at least one stab access opening in both the top and bottom of said housing, and an insulator template located within each of said stab access openings, thereby allowing the plug unit's stabs to electrically contact either of the top and bottom edges of said busbars.

11. A plug-in bus duct as set forth in claim 9 wherein the stab chambers defined in said insulator template are staggered axially of said bus duct so that no two adjacent stab chambers are in the same plane transverse to said bus duct.

12. A plug-in bus duct as set forth in claim 9 including a take-off section on the top of said housing and a take-off section on the bottom of said housing, said take-off sections being aligned substantially transversely to the axis of said bus duct.

13. A plug-in bus duct as set forth in claim 12 including a clip spanning said side walls adjacent each end of said take-off section along the top of said side walls, the spanning portion of each of said clips being substantially spaced above said busbars, and a clip spanning said side walls adjacent each end of said take-off section along the bottom of said side walls, the spanning portion of each of said clips being substantially spaced below said busbars, all of said clips serving to restrain mechanically said busbar group and said side walls in compact side-by-side relation.

14. A plug-in bus duct as set forth in claim 13 wherein said top and bottom clips are positioned in pairs, each pair comprising a top clip and a bottom clip and being in a plane substantially transverse to the axis of said bus duct, and wherein said clips are substantially U-shaped and fitted over the top edges and bottom edges of said side walls, the legs of said clips being positioned on the outside of said side walls.

15. A plug-in bus duct as set forth in claim 14 wherein said housing further includes an H-shaped reinforcing member positioned against each of said side walls in the area of said take-off sections for reinforcing said housing configuration, the legs of said H-shaped members being positioned substantially transverse to the axis of said bus duct, and said H-shaped members being restrained in position against said side walls by said top clips and said bottom clips.

* * * * *